Feb. 12, 1935.   H. E. JAEGER   1,991,219
RULE GAUGE
Filed Nov. 12, 1931
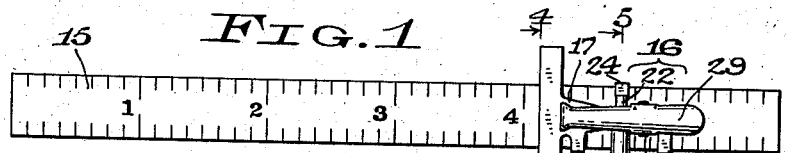
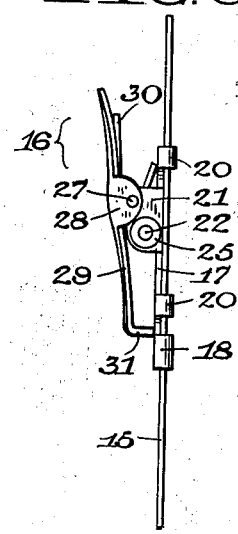
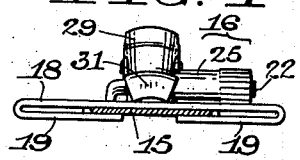
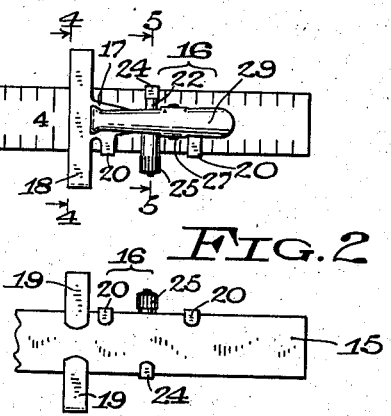
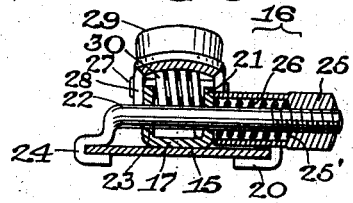
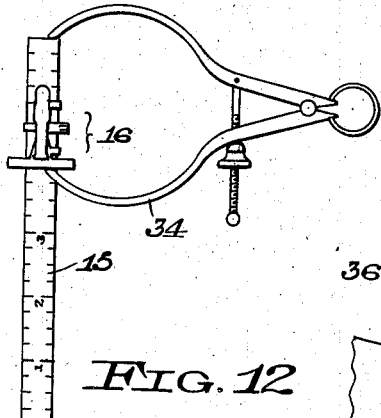
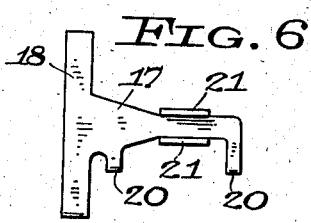
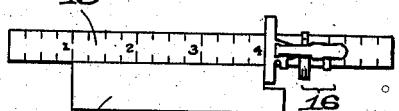
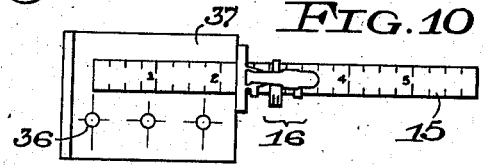
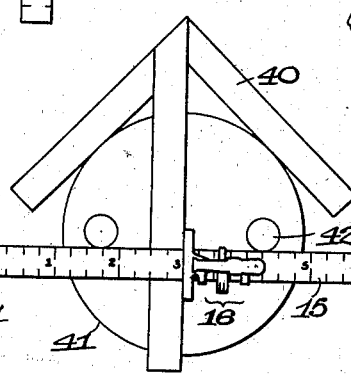
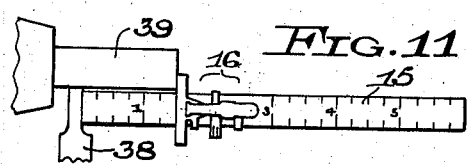
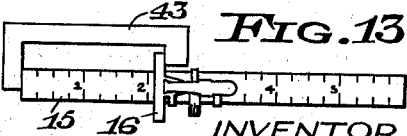
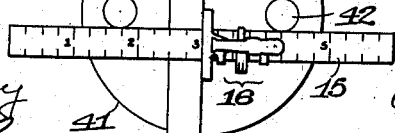
WITNESSES
INVENTOR
Hans E. Jaeger
ATTORNEY Patented Feb. 12, 1935

1,991,219

UNITED STATES PATENT OFFICE 1,991,219

RULE GAUGE

Hans E. Jaeger, Milwaukee, Wis.

Application November 12, 1931, Serial No. 574,520

3 Claims. (Cl. 33—173)

The invention relates to rule gauges and has for an object the provision of a gauge runner of compact, durable, and inexpensive construction which can be readily applied to a metal rule of the thin flexible pocket type, the gauge runner being releasably clamped on the rule to form a T-square therewith, and being provided with a clip by which the instrument may be held in the pocket of the user.

Another object of the invention is to provide a gauge runner which is constructed largely of sheet metal and which has a three-point engagement with the opposite edges of the rule to insure accurate squaring with respect to the rule.

A further object of the invention is to provide a rule gauge in which the gauge runner is frictionally retained in adjusted position on the rule by spring means and is capable of being releasably locked in such position by a threaded member cooperating with the spring means.

The invention further consists in the several features hereinafter set forth and more particularly defined by the annexed claims.

In the accompanying drawing, Fig. 1 is a front view of a rule gauge embodying the invention;

Fig. 2 is a fragmentary rear view of the rule gauge;

Fig. 3 is a fragmentary side view of the rule gauge;

Fig. 4 is a transverse sectional view of the rule gauge taken along the line 4—4 of Fig. 1;

Fig. 5 is another transverse sectional view taken along the line 5—5 of Fig. 1;

Fig. 6 is a front view of the sheet metal frame of the gauge runner;

Fig. 7 is a view of the device in use as a depth gauge;

Fig. 8 is a view of the device in use for setting calipers;

Fig. 9 is a view of the device in use as a hook gauge;

Fig. 10 is a view of the device in use as a T-square and marking gauge;

Fig. 11 is a view of the device in use for setting a cutting-off tool;

Fig. 12 is a view of the device as it appears when used in conjunction with a shaft-centering instrument, and Fig. 13 is a view showing another manner of using the device.

In the drawing, the numeral 15 designates a thin flat flexible steel rule of the type used by mechanics and suitable for pocket use. A gauge runner designated generally by 16 is carried on the rule and is provided with a sheet metal frame 17 which slidably engages the rule. The frame 17 includes a flat bar portion 18 which extends transversely of the rule and projects beyond the opposite edges of the rule. The bar portion 18 is in engagement with one face of the rule and has reversely bent end portions 19, as seen in Fig. 4, engageable with the other face of the rule. The frame 17 is preferably formed of hardened steel, and the opposite edges of the bar portion 18 are ground in parallel relation. Spaced hooks 20 are formed on the frame 17 for engagement with one edge of the rule, and upstanding spaced parallel flanges 21 are formed integrally on the frame at a region between the spaced hooks 20.

A rod 22 is slidably mounted in aligned bores 23 formed in the flanges 21 and extends transversely of the rule with its axis between the spaced hooks 20. One end of the rod 22 is provided with an offset hook 24 engageable with the edge portion of the rule opposite the one engaged by the hooks 20. The other end of the hooked rod is threaded to receive thereon a knurled thumb-nut-forming sleeve 25 which is engageable with the adjacent flange 21 of the frame for clamping the runner on the rule. The opposite edges of the flat bar portion 18 of the frame are disposed in perpendicular relation to the edges of the rule and are retained in such relation by the three-point bearing of the runner on the rule at the hooks 20 and 24. The sleeve 25 has a counterbore 25' to receive therein a compressed coiled spring 26 which bears against the adjacent flange 21 for frictionally retaining the runner on the rule, so that it will remain in adjusted position. The spring also prevents the sleeve 25 from backing off too freely, thereby avoiding accidental loss of parts.

A pivot pin 27 extends transversely through the flanges 21 and is secured at its ends to ears 28 formed on a clip member 29. A coiled spring 30 surrounds the pivot pin 27 and urges the clip member in a direction in which a terminal jaw 31 of the clip member normally engages the outer face of the frame 17. The device may thus be carried in the pocket of the user in the manner of a fountain pen. The clip member also permits the device to be picked up easily from a flat surface.

The rule gauge of the invention may be used in numerous ways, some of which are illustrated in Figs. 7 to 13 of the drawing.

In Fig. 7, the device is used as a depth gauge on a work piece 32 having an opening 33, the runner being either set at a predetermined point on the rule, or being slid along the rule into engagement with the outer face of the apertured work piece in which the end of the rule abuts.

In Fig. 8, the device is used for accurately setting a pair of outside calipers 34. The runner is set at a predetermined distance from one end of the rule and the calipers are then brought into contact with this end of the rule and the ground straight edge of the runner. The device may also be used for setting inside calipers.

In Fig. 9, the device is used as a hook gauge engageable with a work piece 35. In this case the runner is preferably set at some integral calibration on the rule.

Fig. 10 shows the device in use for either checking or marking the location of openings 36 in a work piece 37. In this case the runner is set at some predetermined point on the rule and is brought into contact with the edge of a work piece in the manner of a T-square, thus insuring accurate scribing or checking. When used as a T-square the straight edge of the runner at either face of the rule is available.

Fig. 11 shows the device in use for setting or checking the position of the cutting-off tool 38 with respect to a rotatably driven work piece 39.

In Fig. 12, the device is shown in use as a T-square in conjunction with a centering instrument for a circular work piece 41 to facilitate the scribing of a center line perpendicular to and bisecting a line connecting spaced projections or recesses 42 on the work piece.

Fig. 13 shows the device in use as a distance gauge on a work piece 43 with the opposite edge of the bar portion 18 forming a reference surface.

When the rule rests on a flat surface, such as the top of a desk or bench, it is elevated only slightly therefrom by the thin runner hooks 20 and 24 and the thin reversely bent portions 19 of the cross bar 18. The device can therefore be readily used as a T-square on straight-edged sheets of paper or other thin material resting on the flat surface.

What I claim as new and desire to secure by Letters Patent is:

1. A gauge runner for a flat rule, comprising a sheet metal frame having a flat portion slidably engaging one face of the rule and having two guide hooks extending out of the plane of said flat portion and embracing an edge of the rule, said frame having a straight edge extending transversely of the rule, a pair of spaced ears projecting from opposite side edges of the flat portion of the frame on the opposite side of the plane of said flat portion from said hooks, a rod slidably passing through said ears transversely of the rule and intermediate said hooks and having a hooked end embracing the opposite edge of the rule, and a screw threaded member engageable with said rod for drawing the hooked end thereof into clamping engagement with said rule.

2. A gauge runner for a flat rule, comprising a sheet metal frame having a body portion slidably engaging one face of the rule and having two guide hooks to embrace one edge of the rule at longitudinally spaced points of the rule, said frame having a straight edge extending transversely of the rule, a pair of spaced apertured rod-guiding ears rigidly projecting from the body portion of the frame on the same side of the plane of said rule face as said body portion and being disposed between the opposite side edges of the rule, a rod slidably passing through said ears transversely of the rule at a region intermediate the rule edge bearing points of said body portion and having a hooked end embracing the opposite edge of the rule, and a screw threaded member engageable with said rod for drawing the hooked end thereof into clamping engagement with said rule.

3. A gauge runner for a flat rule, comprising a frame having a body portion slidably engaging one face of the rule and being hooked to embrace one edge of the rule, said frame having an apertured rigidly projecting rod-guiding portion between the opposite side edges of the rule, a rod extending transversely of said frame at the same side of the said rule face as said body portion and slidably guided in said projecting portion, said rod having a reversely hooked end in which the opposite edge of the rule slidably fits and said rod having a screw threaded part the axis of which is at the same side of said rule face as said body portion, and a screw threaded member engageable with the screw threaded part of said rod for drawing the hooked end thereof into clamping engagement with the rule.

HANS E. JAEGER.